(12) United States Patent
Leeder et al.

(10) Patent No.: US 8,423,652 B2
(45) Date of Patent: *Apr. 16, 2013

(54) SERVICE TEMPLATES FOR AN IP MULTIMEDIA SUBSYSTEM

(75) Inventors: Michael Leeder, Stittsville (CA); Roy Sells, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,282

(22) Filed: Jun. 27, 2012

(65) Prior Publication Data

US 2012/0265886 A1 Oct. 18, 2012

Related U.S. Application Data

(63) Continuation of application No. 11/336,141, filed on Jan. 20, 2006, now Pat. No. 8,230,073.

(60) Provisional application No. 60/645,989, filed on Jan. 21, 2005.

(51) Int. Cl.
G06F 15/16 (2006.01)

(52) U.S. Cl.
USPC ........... 709/227; 709/224; 709/228; 370/352; 370/356; 370/467

(58) Field of Classification Search .......... 709/224–228; 370/352–356
See application file for complete search history.

(56) References Cited

U.S. PATENT DOCUMENTS

| | | |
|---|---|---|
| 6,760,916 B2 | 7/2004 | Holtz et al. |
| 7,385,946 B2 | 6/2008 | Devarapalli et al. |
| 7,548,960 B2 | 6/2009 | Kang et al. |
| 7,925,688 B2 | 4/2011 | Mampaey et al. |
| 2001/0056439 A1 | 12/2001 | Carro |
| 2002/0036983 A1 | 3/2002 | Widegren et al. |
| 2002/0062379 A1 | 5/2002 | Widegren et al. |
| 2002/0114305 A1 | 8/2002 | Oyama et al. |
| 2002/0143972 A1 | 10/2002 | Christopoulos et al. |
| 2002/0181683 A1 | 12/2002 | Mani |
| 2002/0181694 A1 | 12/2002 | Mani |
| 2003/0045290 A1* | 3/2003 | Tuohimetsa et al. .......... 455/435 |
| 2003/0079020 A1 | 4/2003 | Gourraud et al. |
| 2003/0108001 A1 | 6/2003 | Roy |
| 2003/0128714 A1 | 7/2003 | Mio et al. |
| 2004/0015401 A1 | 1/2004 | Lee et al. |
| 2004/0031053 A1 | 2/2004 | Lim et al. |
| 2004/0162094 A1 | 8/2004 | Riikonen et al. |

(Continued)

*Primary Examiner* — Wing F Chan
*Assistant Examiner* — Razu Miah
(74) *Attorney, Agent, or Firm* — Meyertons, Hood, Kivlin, Kowert & Goetzel, P.C.; Stephen J. Curran

(57) ABSTRACT

The present invention provides a call/session control function for an Internet Protocol multimedia subsystem where a service template may be invoked in lieu of a single multimedia service. The service template identifies a number of multimedia services and associated logic for invoking the multimedia services, once the service template is invoked. In operation, a signaling message is received and appropriate filtering criteria are retrieved for the signaling message. Filtering criteria define a set of rules identifying any multimedia services that need to be invoked in light of receiving the signaling message. The filtering criteria will identify a service template, and perhaps other multimedia services to invoke directly. If a service template is invoked, the service template is obtained and the logic controlling invocation of the associated multimedia services is applied to effect invocation of the multimedia services.

10 Claims, 9 Drawing Sheets

U.S. PATENT DOCUMENTS

| | | |
|---|---|---|
| 2004/0187021 A1* | 9/2004 | Rasanen ............... 713/200 |
| 2004/0213201 A1 | 10/2004 | Osterlund |
| 2004/0243711 A1* | 12/2004 | Rajaniemi ............... 709/227 |
| 2004/0249927 A1 | 12/2004 | Pezutti |
| 2004/0260624 A1* | 12/2004 | Chan et al. ............... 705/26 |
| 2004/0260815 A1* | 12/2004 | Mampaey et al. ......... 709/227 |
| 2005/0018267 A1 | 1/2005 | Ando |
| 2005/0021351 A1 | 1/2005 | Koskinen et al. |
| 2005/0213606 A1* | 9/2005 | Huang et al. ............. 370/467 |
| 2005/0238002 A1 | 10/2005 | Rasanen |
| 2006/0034195 A1 | 2/2006 | Blaiotta et al. |
| 2006/0058047 A1 | 3/2006 | Jeong et al. |
| 2006/0072516 A1 | 4/2006 | Jeong et al. |
| 2006/0133391 A1 | 6/2006 | Kang et al. |
| 2006/0140385 A1 | 6/2006 | Haase et al. |
| 2006/0209768 A1 | 9/2006 | Yan et al. |
| 2006/0239267 A1 | 10/2006 | Ryu |
| 2006/0253538 A1 | 11/2006 | Jung et al. |
| 2006/0285537 A1 | 12/2006 | Mahdi |
| 2007/0019625 A1 | 1/2007 | Ramachandran et al. |

* cited by examiner

User 1 Filtering Criteria (no related service template)

When signaling message is a SIP Invite:
    Invoke Service 1 when:
        Time of day is between 9 AM and 5 PM, user is at office, and available;
    Invoke Service 2 when:
        Time of day is between 9 AM and 5 PM, user is at office, and in meeting;
    Invoke Service 3 when:
        Time of day is between 9 AM and 5 PM, user is not at office;
    Invoke Service 3 when:
        Time of day is between 5 PM and 9 PM;
    Invoke Service 4 when:
        Time of day is between 9 PM and 9 AM.

When signaling message is a SIP Message, invoke Service 5.

When user is offline, invoke Service 6.

*FIG. 5A*

User 1 Filtering Criteria (service template available)

When signaling message is a SIP Invite:
    Invoke Service Template A when:
        Time of day is between 9 AM and 5 PM, user is at office, and available;
    Invoke Service 2 when:
        Time of day is between 9 AM and 5 PM, user is at office, and in meeting;
    Invoke Service 3 when:
        Time of day is between 9 AM and 5 PM, user is not at office;
    Invoke Service 3 when:
        Time of day is between 5 PM and 9 PM;
    Invoke Service 4 when:
        Time of day is between 9 PM and 9 AM.

When signaling message is a SIP Message, invoke Service 5.

When user is offline, invoke Service 6.

*FIG. 5B*

Service Template A

When time of day is between 9 AM and 5 PM, invoke Service 1 (work related service)
    If destination in subsequent Invite requires push-to-talk capability, invoke Service 2 (push-to-talk service) for subsequent Invite;

Otherwise, Invoke Service 3 (voice over IP service at work).

When time of day is between 5 PM and 9 AM, invoke Service 4 (personal related service)
    If SDP in subsequent Invite indicates voice over IP is required, invoke Service 5 (voice over IP service at home) for subsequent Invite;

Otherwise, Invoke Service 6 (instant messaging service).

SERVICE TEMPLATES FOR AN IP MULTIMEDIA SUBSYSTEM

CROSS-REFERENCE TO RELATED APPLICATION

This application is a continuation application of U.S. patent application Ser. No. 11/336,141, entitled "SERVICE TEMPLATES FOR AN IP MULTIMEDIA SUBSYSTEM", filed Jan. 20, 2006, now U.S. Pat. No. 8,230,073 which claims the benefit of U.S. Provisional patent application Ser. No. 60/645,989 entitled "DYNAMIC MULTIMEDIA SERVICES DISCRIMINATION," which was filed in the U.S. Patent and Trademark Office on Jan. 21, 2005. This application is related to concurrently filed U.S. utility patent application Ser. No. 11/337,144 entitled "ENHANCED FILTERING FOR AN IP MULTIMEDIA SUBSYSTEM."

FIELD OF THE INVENTION

The present invention relates to telecommunications, and in particular to providing service templates, which provide aggregation of services, for an IP multimedia subsystem.

BACKGROUND OF THE INVENTION

The Internet Protocol (IP) multimedia subsystem (IMS) is a standardized architecture for providing multimedia services over any network supporting packet-based communications. IMS can also be extended to circuit-switched networks through appropriate gateways. IMS is configured to provide a centralized service control system across different network architectures. As such, IMS can support multimedia services over any type of access network. These access networks may support fixed or wireless communications, as long as there is a mechanism to support packet-based communications. Further, IMS allows user mobility wherein the multimedia services are available to a subscriber regardless of location, since the multimedia services may be provided over different access networks and at different locations. The types of multimedia services available through IMS are limitless, but include voice over IP (VoIP), push to talk, multi-party gaming, video conferencing, messaging, presence sharing, content sharing, and related services.

IMS generally uses VoIP technology based on a third generation partnership project (3GPP) implementation of the Session Initiation Protocol (SIP). IMS runs over the standard IP. With IMS, the services can be provided to subscribers irrespective of their location, access technology, and terminal. Although the proposed IMS architecture is flexible in providing multimedia services, it is limited in how these services are selected for a given call or session. At the present, the signaling messages used for call or session signaling are the only sources of information that can be used to determine if and when to invoke a multimedia service. Further, given the plethora of available multimedia services, there is a need to aggregate multimedia services in a manageable fashion and invoke these applications in a flexible and efficient manner.

SUMMARY OF THE INVENTION

The present invention provides a control function, such as a serving call/session control function, for an Internet Protocol multimedia subsystem where a service template may be invoked in lieu of a single multimedia service. The service template identifies a number of multimedia services and associated logic for invoking the multimedia services, once the service template is invoked. In operation, a signaling message is received and appropriate filtering criteria are retrieved for the signaling message. Filtering criteria define a set of rules identifying any multimedia services that need to be invoked in light of receiving the signaling message. The filtering criteria will identify a service template, and perhaps other multimedia services to invoke directly. If a service template is invoked, the service template is obtained and the logic controlling invocation of the associated multimedia services is applied to effect invocation of the multimedia services. As such, the service template is a technique for aggregating multiple multimedia services in a defined way, and allow the filtering criteria to dictate when the service template is invoked.

The multimedia services are generally invoked by having the signaling message processed by a multimedia service application. Multimedia service applications may reside on remote application servers, and for the present invention, on an internal multimedia service function directly associated with the call/session control function. Further, an adaptation function may be employed when the selected multimedia services are to be invoked on application servers residing on a disparate network using a different messaging format or protocol. The adaptation function may provide the requisite messaging or protocol conversion to allow the signaling message to be sent to the application server on the disparate network and returned, if necessary, for further processing. Once the selected multimedia services are invoked, the call/session control function will forward the signaling message toward an appropriate destination.

The filtering criteria may take into consideration internal information found within the signaling message as well as external information that is not found within the signaling message. The external information may relate to date, time, presence information, location information, user information, group information, and network information. The external information may change dynamically, and as such, the filtering criteria may be applied to a given signaling message in a different manner as the external information changes. Further, the filtering criteria to be applied to a signaling message may be configured on a user, group, or network basis.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 5A and 5B are exemplary filtering criteria according to one embodiment of the present invention.

FIG. 6 illustrates an exemplary service template according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
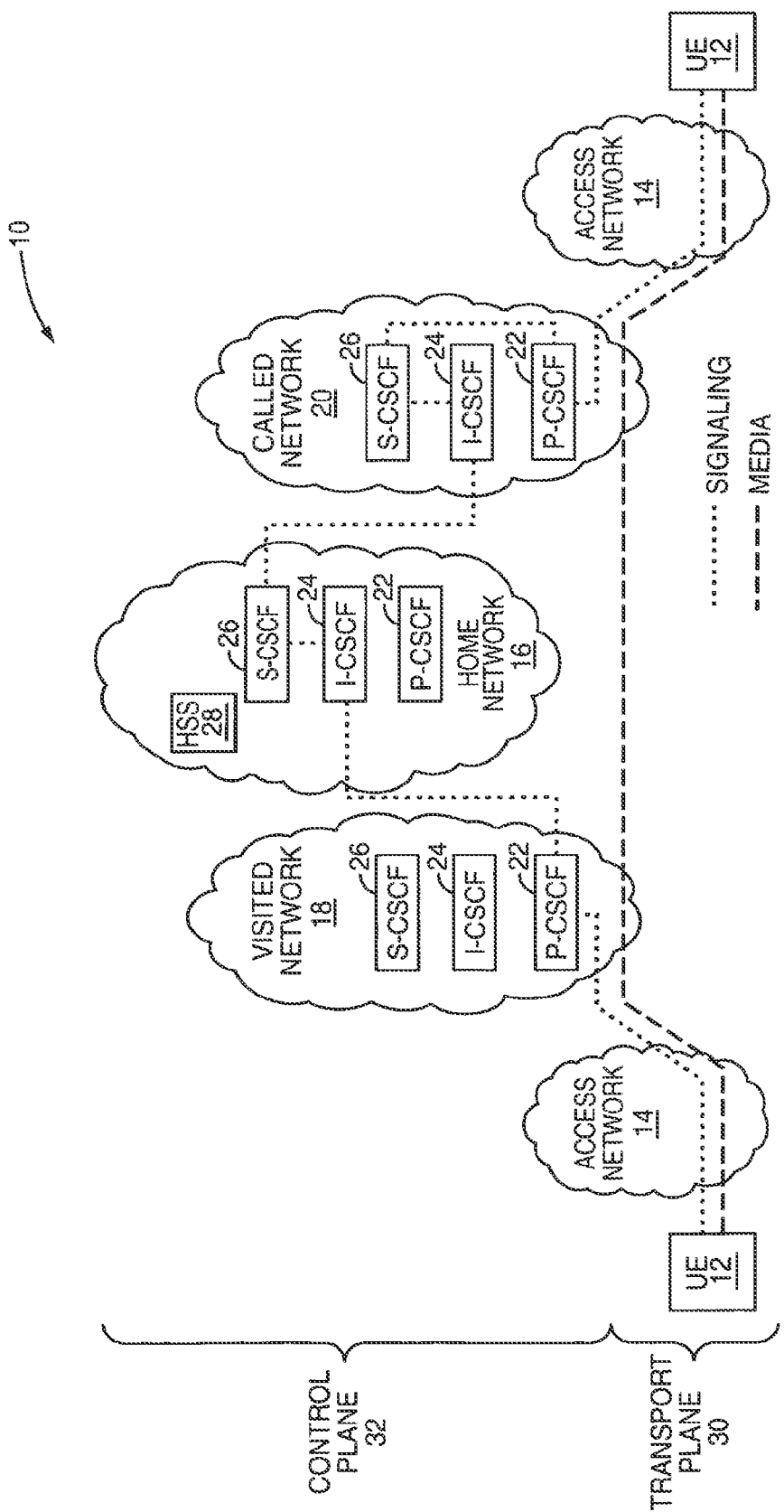
FIG. 1 illustrates an IP multimedia subsystem according to one embodiment of the present invention.

With reference to FIG. 1, an IMS architecture 10 is illustrated. In this example, user elements (UE) 12 are capable of communicating with each other via their respective access networks 14. For a given call or session between the user elements 12, the IMS architecture will provide the requisite signaling to establish and control the call or session. For conciseness and readability, calls or sessions are collectively referred to as a session. Further, the media delivered in the sessions may be data, audio, video, or voice.

The IMS architecture 10 is centered about several call/session control functions (CSCFs), which are implemented as SIP servers or proxies in one embodiment of the present invention. These CSCFs are used to process SIP signaling packets, which facilitate signaling required for establishing and controlling the sessions.

As illustrated, session signaling may be provided in various networks, such as a visited network 18, a home network 16, and a called network 20. The visited network 18 represents the network currently supporting a roaming user element 12. The home network 16 is the house services network for the user element 12, and the called network 20 is a visited or home network for the user element 12 that is terminating a particular session.

Each of these network may include CSCFs. In the IMS architecture 10, the CSCFs are implemented having three primary functions: a proxy CSCF (P-CSCF) 22, an interrogating CSCF (I-CSCF) 24, and a serving CSCF (S-CSCF) 26. The P-CSCF 22 is a SIP proxy that is the first point of contact for a user element 12, and can be located in a visited network 18 or home network 16. As illustrated, the P-CSCF 22 for the leftmost user element 12 is located in the visited network 18. The user element 12 will be assigned to the P-CSCF 22 during registration. The P-CSCF 22 is in the signaling path of all signaling messages, and will authenticate the user and establish a security association with the user element 12. The P-CSCF 22 may also compress and decompress SIP messages in an effort to reduce signaling overhead or increase response times over slow radio links. Further, the P-CSCF 22 will map the user ID associated with the user element 12 to an appropriate CSCF 24.

The I-CSCF 24 is also a SIP proxy and is located at the edge of an administrative domain. The IP address of the I-CSCF 24 is published in the domain name service of the administrative domain, such that the P-CSCF 22 in the visited network 18, as well as any other entities, can locate the I-CSCF 24 and use it as a point of entry for all signaling messages in the administrative domain. The I-CSCF 24 will query a home subscriber server (HSS) 28 to determine the location of the user element 12 and identify the S-CSCF 26 to use for session control. Accordingly, the I-CSCF 24 will assign an S-CSCF 26 for the user element 12. As illustrated, the I-CSCF 24 and the S-CSCF 26 are located in the home network 16, along with the HSS 28. The HSS 28 is essentially a master database that supports various network entities that are involved in establishing and controlling sessions. The HSS 28 contains user profiles and other related subscription information, assists in authentication and authorization of a user, and can provide information about the physical location of a user by keeping track of the location of the user element 12.

The S-CSCF 26 is generally the central signaling node in the IMS architecture 10. The S-CSCF 26 acts as a SIP server and performs session control. Notably, the S-CSCF 26 resides in the path of all signaling messages for the user element 12, and can inspect every signaling message. Based on inspecting the signaling messages, the S-CSCF 26 can determine if and when to invoke multimedia services for the user element 12 or an associated session.

Each user element 12 in the IMS architecture 10 will be associated with a given P-CSCF 22, I-CSCF 24, and S-CSCF 26. As illustrated, the leftmost user element 12 is associated with the P-CSCF 22 in the visited network 18, and the I-CSCF 24 and S-CSCF 26 in the home network 16. The rightmost user element 12 is illustrated as being associated with the P-CSCF 22, I-CSCF 24, and S-CSCF 26 in the called network 20. Those skilled in the art will recognize that the called network 20 may represent called parties' visited and home networks. The S-CSCF 26 in the called network 20 may also be implemented to provide multimedia services associated with the rightmost user element 12 and the corresponding session. As illustrated, the media is provided over a transport plane 30 and session control is provided in the control plane 32, which is comprised of the P-CSCF 22, I-CSCF 24, and S-CSCF 26.

Figure 2:
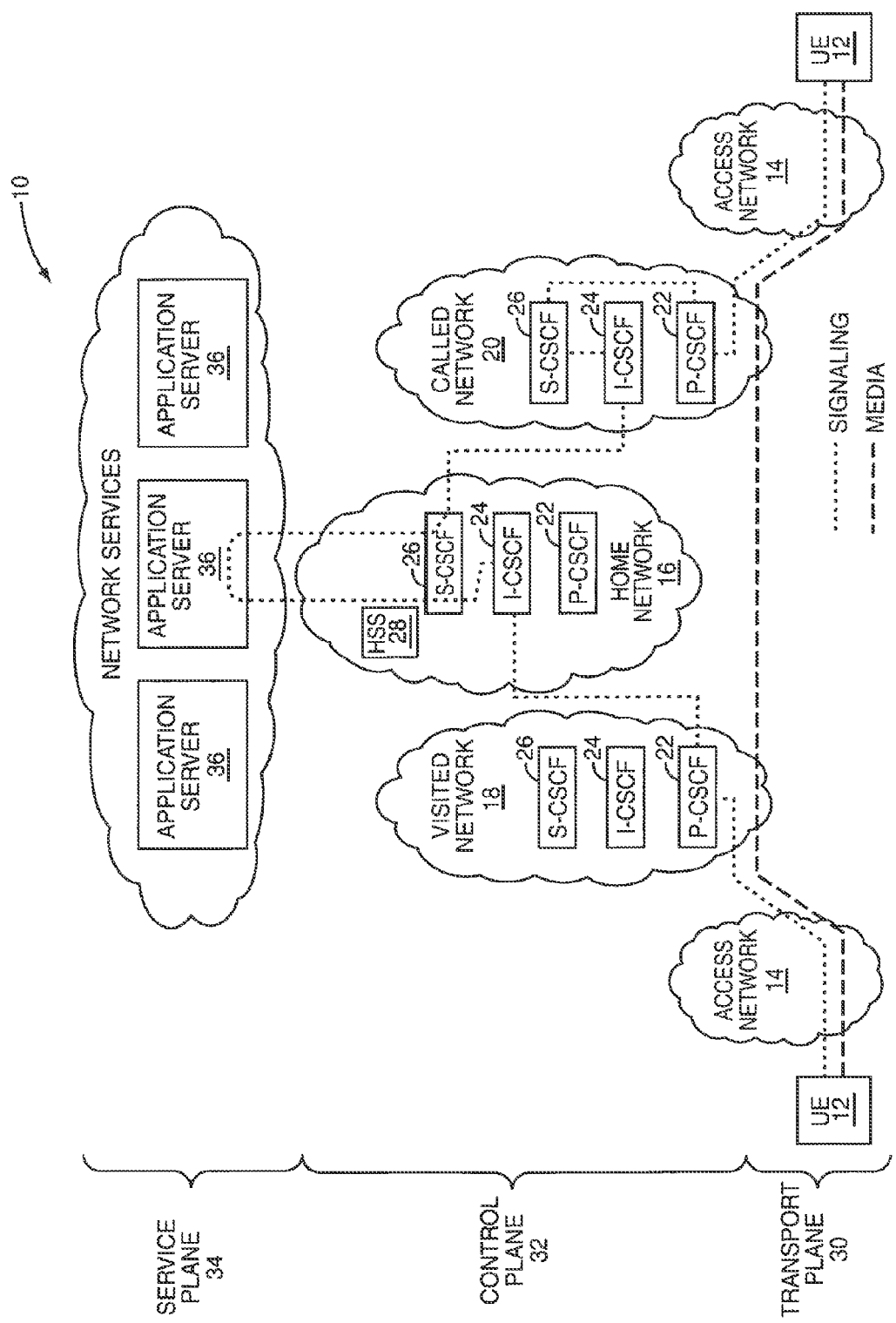
FIG. 2 illustrates an IP multimedia subsystem and available network services according to one embodiment of the present invention.

With reference to FIG. 2, the multimedia services are provided in a service plane 34, which is generally made up of numerous application servers 36, which are capable of providing one or more multimedia services. To provide a multimedia service, the S-CSCF 26 will identify the appropriate multimedia service and forward signaling messages to the application server 36 chosen to provide the multimedia service. The application server 36 will provide the multimedia service by effectively processing the signaling message and returning the processed signaling message back to the S-CSCF 26, if necessary, which will forward the signaling message in a desired fashion. As such, the application server 36 providing a selected multimedia service will also reside in the signaling path. Although the S-CSCF is used as a primary example, the present invention may be implemented on any CSCF or on any appropriate processing node provided in an IMS.

Figure 3A:
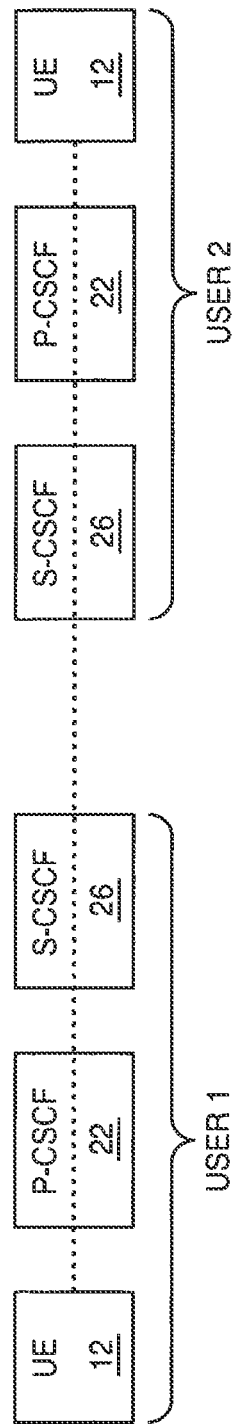
FIG. 3A is a block representation of a signaling path in an IP multimedia subsystem where no multimedia services are invoked.
Figure 3B:
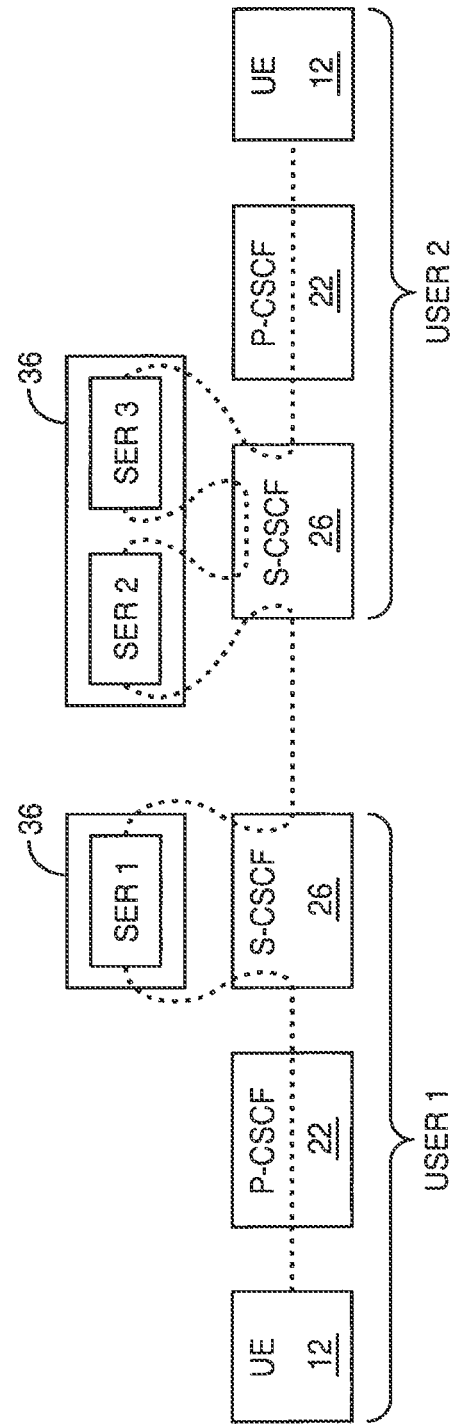
FIG. 3B is a block representation of a signaling path in an IP multimedia subsystem where multiple multimedia services are invoked.

FIGS. 3A and 3B illustrate signaling paths between respective user elements 12. For FIG. 3A, an application server 36 is not employed to invoke a multimedia service. As such, the signaling path extends from the user element 1 to a P-CSCF 22 and an S-CSCF 26 for a first party to an S-CSCF 26, a P-CSCF 22, and on to the user element 12 of a second party. Notably, the I-CSCF 24 is left out of the diagram for clarity. With reference to FIG. 3B, the S-CSCF 26 associated with the first user invokes a first service (Service 1) from a first application server 36, and the S-CSCF 26 associated with the second user invokes two multimedia services (Services 2 and 3) from another application server 36. As illustrated, the signaling path for the messages extend through each of the respective application servers 36 to facilitate the respective multimedia services. When invoked, signaling messages are routed to the appropriate application server 36 and returned from the S-CSCF 26, and returned to the S-CSCF 26 after the signaling message has been processed according to the multimedia service. The application server 36 and the S-CSCF 26 interface with one another using ISC (IMS Service Control), which is based on SIP. Depending on the actual multimedia service invoked, the application server 36 can operate in a SIP proxy mode, a SIP user agent mode (originating and terminating), a SIP back-to-back user agent mode, or redirect server. The application servers 36 can be located on the home network 16 or a third party network.

In a traditional IMS architecture, filtering criteria for a particular user is obtained for a given signaling session, and the signaling messages for the signaling session are processed in light of the filtering criteria. Filtering criteria define a set of rules to determine if and when to invoke a multimedia service when certain conditions are met. Prior to the present invention, the filtering criteria were based solely on information contained within the signaling message. Further, the filtering criteria were kept on a per-user basis. One embodiment of the present invention extends the filtering criteria to include information outside of the signaling message being processed. In particular, filtering criteria may be based on internal information contained within the signaling message as well as external information, such as user profile information, time of day, date, location information, presence information, and the like, which are not contained in the signaling message but are available to the S-CSCF 26 through some other source. The external information may be fixed or dynamic, and, as those skilled in the art will recognize, virtually unlimited. The present invention also allows filtering to be provided on a network or group basis, as well as on a user-by-user basis. The filtering criteria for a network or group may also include external information that is not found within the signaling message. Notably, the filtering criteria may be based solely on external information. With the present invention, the extended and dynamic filtering criteria allows much improved triggering and service selectivity for existing and future multimedia services.

Figure 4:
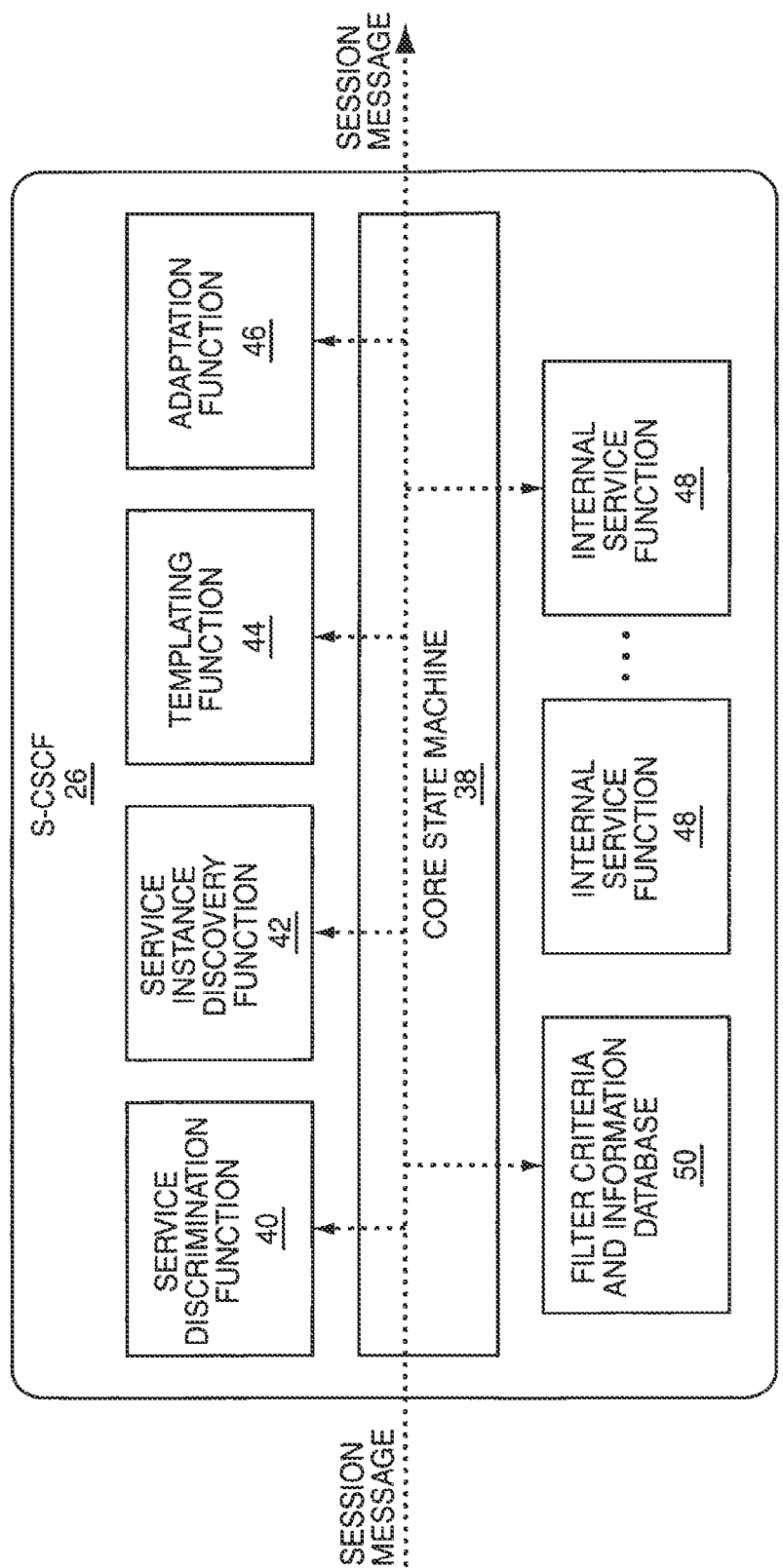
FIG. 4 is a block representation of a serving call/session control function (S-CSCE) according to one embodiment of the present invention.

FIG. 4 provides a functional block diagram of an S-CSCF 26 according to one embodiment of the present invention. The core processing capabilities are provided in a core state machine 38, wherein signaling messages are received, processed, and forwarded as necessary. Associated with the core state machine 38 are a service discrimination function 40, a service instance discovery function 42, a templating function 44, an adaptation function 46, internal service functions 48, and a filter criteria and information database 50, which may be provided by any type of associated memory or storage facility.

Once a user element 12 is assigned to an S-CSCF 26, all signaling messages are passed through the S-CSCF 26 and processed accordingly. When a signaling message arrives at the S-CSCF 26, the service discrimination function 40 determines the appropriate filter criteria to apply to the signaling message, and then applies the filtering criteria to the signaling message to determine if a multimedia service should be invoked, and assuming a multimedia service should be invoked, where the multimedia service should be invoked. For the present invention, the multimedia services may be provided by one or more of the application servers 36 or by one of the internal service functions 48. As noted above, the present invention extends the filter criteria to include external information that is not included within the signaling message. The external information can be stored in a temporary or permanent fashion in the filter criteria and information database 50 in addition to the filter criteria, Network, group, and user filtering criteria may be employed alone or in any order. Generally, the service discrimination function 40 will look first to see if there are network filtering criteria with the signaling message, second look for group filtering criteria, and third look for user filtering criteria. Notably, filtering criteria from the network, group, and user may be applied to a single message. The user filtering criteria may be stored in the HSS 28 and retrieved when the user element 12 registers with the IMS. The network and group filter criteria may be stored locally or retrieved from an appropriate database. Accordingly, the filtering criteria may be stored temporarily or permanently in the filter criteria and information database 50. Since the filter criteria may take into consideration external information that may change dynamically, the S-CSCF 26 may be configured to access and update various parameters, such as date, time of day, location, and presence information for a given user, group, or network, such that the appropriate filter criteria can be applied to the signaling message by the service discrimination function 40.

As a result of applying the appropriate filter criteria to a signaling message, the service discrimination function 40 may identify one or more multimedia services to invoke, and where the multimedia services should be invoked. Having decided on where a multimedia service should be invoked, the service instance discovery function 42 is employed to select a physical instance to employ for invoking the multimedia service. At any given time, the same multimedia services may be provided in multiple instances, wherein any given instance may be used to provide the multimedia service. Different instances of the multimedia service may be used for failover protection or selected based on load or other processing efficiencies. For further information pertaining to service instance discovery, attention is drawn to co-assigned U.S. application Ser. No. 10/890,043, filed Jul. 13, 2004, which is currently pending. Once the desired instance of a selected multimedia service has been determined, the S-CSCF 26 will invoke the multimedia service by sending the signaling message to the location, application server 36, or internal service function 38, providing the multimedia service.

If the application server 36 selected to provide the multimedia service is not a recognized or industry standard interface, the adaptation function 46 can be employed to provide the necessary protocol conversion and interworking to allow the signaling message to be sent to the application server 36 as well as receive the return signaling message after the application server 36 has provided the multimedia service. In general, invoking a multimedia session results in sending the signaling message to the appropriate application server 36 or an internal service function 48, and receiving a processed signaling message in return. Upon receiving the processed signaling message, further filtering criteria may be provided to the signaling message, and the same or additional multimedia services may be invoked by the same or different application servers 36 or internal service functions 48. Further, the filtering criteria triggered from one signaling message may be used to process a subsequent signaling message in a defined manner.

In one embodiment of the present invention, service templates are created and made accessible via the templating function 44. The service templates appear as a multimedia service application and can be invoked by the service discrimination function 40 in light of appropriate filter criteria. The service templates provide a front end for multiple multimedia services. The service template identifies multimedia services that can or should be invoked and the sequencing and logic to use in executing the multimedia services. Although the service templates appear as a multimedia service, they are run as part of the control plane 32, and not the service plane 34. Once a service template is invoked, the templating function 44 can provide the requisite processing and then invoke the corresponding multimedia services as dictated by the logic of the service template. Again, the multimedia services may be provided by applications running on the application servers 36 or the internal service functions 38. A service template may have any or all of the attributes of a multimedia service. These attributes may include the ability to generate bills, respond to users, and error handling. The service template may be invoked in the same manner and using the same interface as an application providing multimedia services. An example of such an interface is the 3GPP (ISG) standard interface.

With reference to FIG. 5A, example filter criteria for a first user is provided. The filter criteria incorporates internal and external information. The internal information relates to the type of signaling message, whether the message is a SIP Invite or a SIP Message. The external information relates to time of day, location, and presence information. Presence information is basically any type of information related to the relative availability of a user for communications, the type of communication method to use when communicating with the user, the location of the user, or the like. In the illustrated example, when the signaling message is a SIP Invite:

A first service is invoked with the time of day is between 9 AM and 5 PM, the user is at her office, and available for communications;
  A second service is invoked when the time of day is between 9 AM and 5 PM, the user is at her office, but in a meeting;
  A third service is invoked when the time of day is between 9 AM and 5 PM and the user is not at her office;
  The third service is also invoked when the time of day is between 5 PM and 9 PM; and
  A fourth service is invoked when the time of day is between 9 PM and 9 AM.

When the signaling message is a SIP Message, a fifth service is invoked. When the user is offline, a sixth service is invoked. Those skilled in the art will recognize the innumerable ways in which to configure filter criteria for a user, a group, or a network according to the concepts of the present invention.

With reference to FIG. 5B, filter criteria similar to that illustrated in FIG. 5A is provided. The exception is that the first service is replaced with a requirement to invoke Service Template A when the time of day is between 9 AM and 5 PM, and the user is in her office and available for communications. Service Template A is not an application providing a particular multimedia service. Instead, Service Template A is a front end for an aggregation of multiple multimedia services, which may be provided by different applications residing at different locations in different sequences or orders depending on the logic incorporated by the service template. When the service discrimination function 40 determines that Service Template A should be invoked, the templating function 44 is employed to access Service Template A and call upon one or more applications to invoke multimedia services according to logic provided in the service template. Notably, the service template logic provides extensive service logic control constraints, such as conditional evaluation, looping, selection, and forking.

An exemplary service template for Service Template A is provided in FIG. 6. The logic of Service Template A may set forth a sequence in which multimedia services should be invoked as well as provide associated logic to control if and when the multimedia services should be employed as well as the sequence in which they should be employed. For the example given, the following logic is employed. When the time of day is between 9 AM and 5 PM, a work-related service (Service 1) is invoked. Further, if the destination in a subsequent SIP Invite message requires a push-to-talk capability, a second service (Service 2) is invoked for the subsequent SIP Invite. Otherwise, a third service (Service 3) supporting voice over IP is invoked in subsequent signaling messages. When the time of day is between 5 PM and 9 AM, a personal-related service (Service 4) is invoked. For subsequent signaling messages, the Session Data Protocol (SDP) information in the SIP messages are analyzed. If the SDP information in a subsequent SIP Invite indicates voice over IP is required, a fifth service (Service 5) associated with providing voice over IP service at the user's home is employed. Otherwise, a sixth service (Service 6) associated with an instant messaging service is invoked for subsequent signaling messages.

Figure 7A:
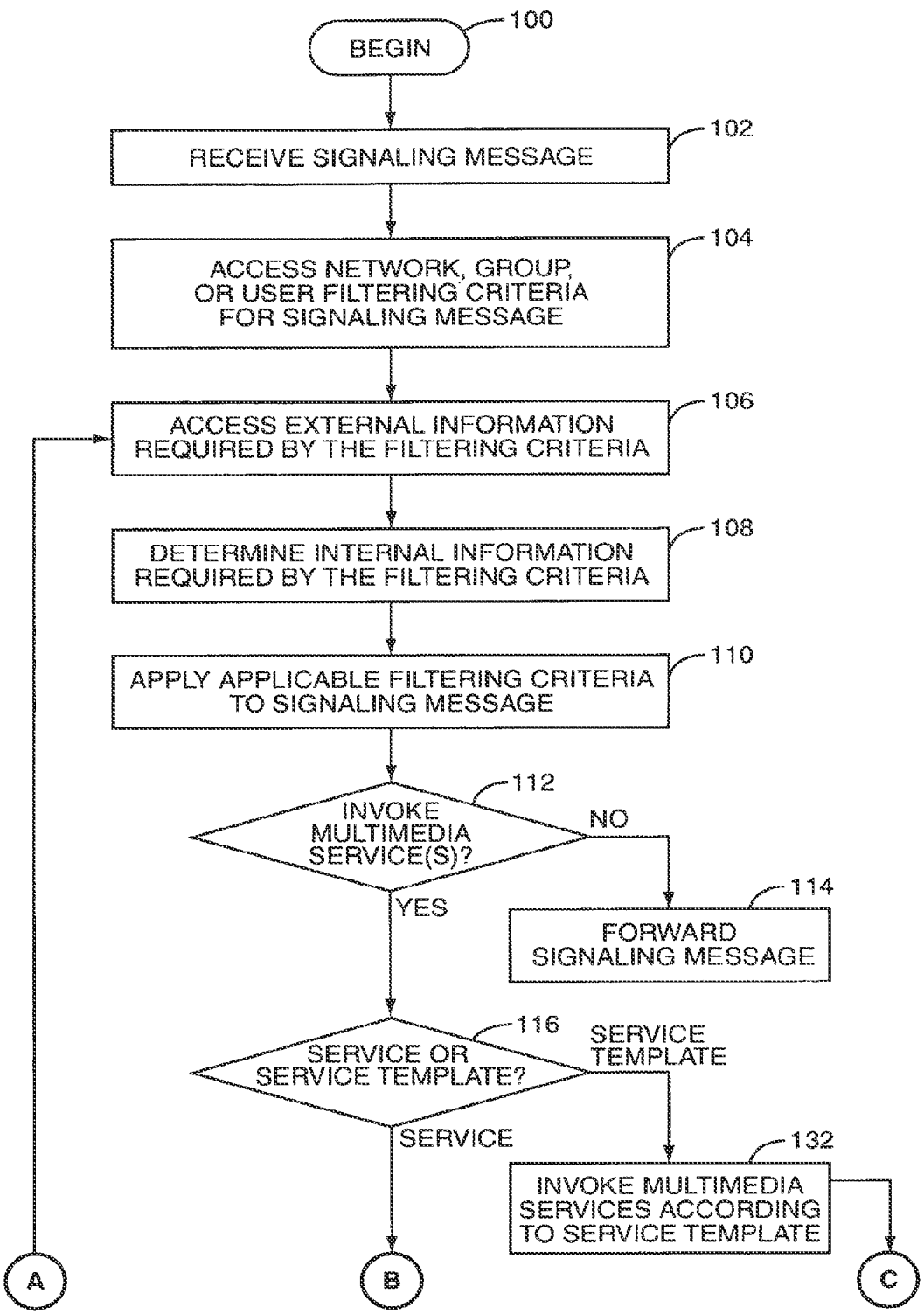
FIGS. 7A and 7B are a flow diagram illustrating the operation of an S-CSCF according to one embodiment of the present invention.
Figure 7B:
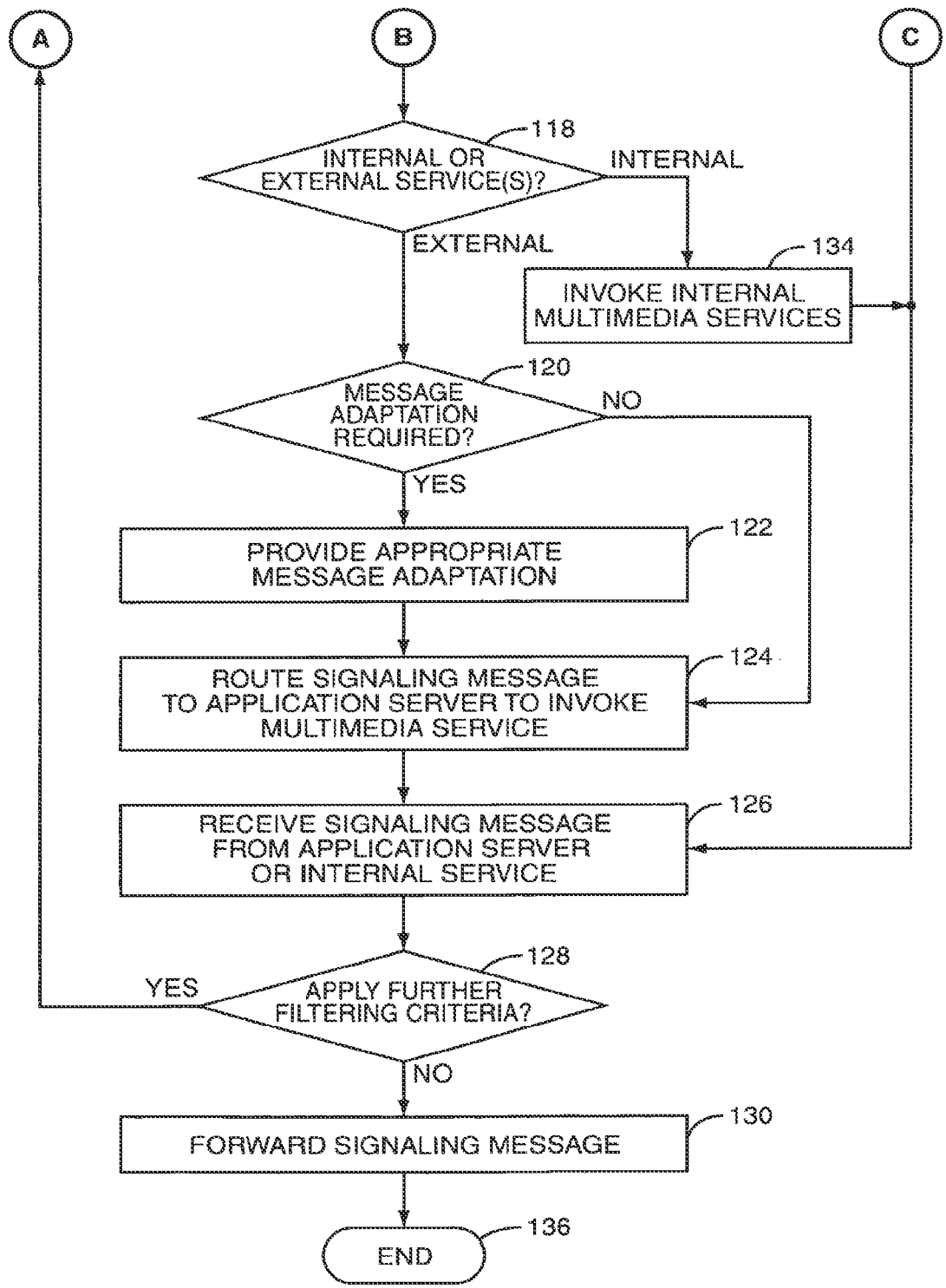

With reference to FIGS. 7A and 7B, an exemplary flow diagram is provided to illustrate operation of one embodiment of an S-CSCF 26 according to the present invention. Once the user element 12 registers with the IMS and is assigned to the S-CSCF 26, signaling messages are routed through the S-CSCF 26 wherein the operation highlighted by the flow diagram begins (step 100). Accordingly, the S-CSCF 26 will receive a signaling message (step 102) originating from or intended for the user element 12. Based on the signaling message or other pertinent information, the S-CSCF 26 will access network, group, or user filtering criteria for the signaling message (step 104). The S-CSCF 26 may also access any external information required by the filtering criteria (step 106). Once any necessary external information is received, the S-CSCF 26 will analyze any internal information required by the filtering criteria (step 108) and apply the applicable filtering criteria to the signaling message (step 110). Based on the internal and external information in light of the filtering criteria, the S-CSCF 26 will identify any multimedia services to invoke (step 112). If there are no multimedia services to invoke in light of the filtering criteria, the S-CSCF 26 will forward the signaling message toward its destination (step 114).

If a multimedia service should be invoked, the S-CSCF 26 will determine whether the multimedia service is a multimedia service provided by the application server 36, an internal service function 48, or a service template provided by the templating function 44 (step 116). For a regular multimedia service, the S-CSCF 26 will determine whether the multimedia service to invoke is an internal or external service (step 118). For external multimedia services, the S-CSCF 26 may then determine whether message adaptation is required (step 120), and if adaptation is required, provide appropriate message adaptation by the adaptation function 46 (step 122).

At this point, the S-CSCF 26 will route the signaling message to the appropriate application server 36 to invoke the multimedia service using the internal service function 48 (step 124). If adaptation was required, the signaling message will be routed as adapted, otherwise, normal SIP messaging will be used to send the signaling message to the application server 36 or the internal service function 48. At this time, the signaling message will be processed according to the invoked multimedia service and returned to the S-CSCF 26 from the application server 36 or the internal service 48 (step 126). The service discrimination function 40 may determine whether further filtering criteria should be applied to the returned signaling message (step 128). If no further filtering is required, the processed signaling message is forwarded toward its destination (step 130). If further filter criteria is provided, the process will repeat, wherein updated external information may be obtained and additional filter criteria may be provided to the signaling message.

If the service discrimination function 40 determines that a service template was invoked instead of a multimedia service (step 116), the templating function 44 may be invoked to effectively invoke multimedia services according to the selected service template (step 132). The multimedia services within the service template are invoked as described above in a manner dictated by the service template. Further, if a multimedia service provided by an internal service function 48 should be invoked through the service template or directly based on initial filtering (step 118), the signaling message is effectively passed to the internal service function 48 to invoke the requisite internal multimedia services (step 134). Once processing according to a service template or an internal multimedia service is completed, the resultant signaling message is processed in the normal fashion, wherein the S-CSCF 26 will determine whether additional filtering criteria should be applied (step 128) or the signaling message should be forwarded toward its destination (step 130), wherein the process ends for that particular signaling message (step 136).

Figure 8:
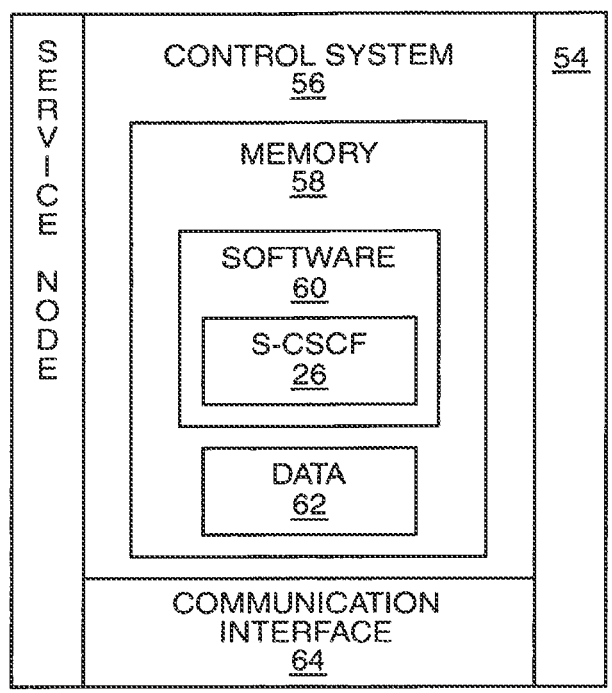
FIG. 8 illustrates a service node in which an S-CSCF may be implemented in whole or in part according to one embodiment of the present invention.

The S-CSCF 26 may be implemented in a unified or distributed fashion among any number of service control entities, which may provide other signaling functions. These call control entities may be referred to as a service node 54, which is depicted in FIG. 8. As illustrated, the service node 54 may include a control system 56 having sufficient memory 58 for the software 60 and data 62 to operate as described above. In particular, the software 60 may implement an S-CSCF 26 as well as any number of functions, including those of the I-CSCF 24 or a P-CSCF 22. The control system 56 will also be associated with a communication interface 64 to facilitate packet communications over the network supporting the service node 54.

Those skilled in the art will recognize improvements and modifications to the preferred embodiments of the present invention. All such improvements and modifications are considered within the scope of the concepts disclosed herein and the claims that follow.

What is claimed is:

1. A non-transitory computer readable memory medium comprising program instructions for providing a call/session control function in an Internet Protocol multimedia subsystem, wherein the program instructions are executable to implement:
   providing a plurality of service templates, each service template identifying a plurality of multimedia services and associated logic for invoking the multimedia services;
   receiving a signaling message associated with a call or session involving a user element;
   selecting one of the plurality of service templates for the signaling message; and
   invoking the multimedia services identified by the one of the plurality of service templates according to the associated logic.

2. The non-transitory computer readable memory medium of claim 1, wherein the service template appears as a multimedia service.

3. The non-transitory computer readable memory medium of claim 2, wherein the program instructions are further executable to implement:
   accessing filtering criteria to be applied for the signaling message, the filtering criteria comprising rules for invoking at least one multimedia service and the service template;
   applying the filtering criteria for the signaling message to select the at least one multimedia service or the one of the plurality of service templates, wherein:
      when the one of the plurality of service templates is selected, the multimedia services identified by the one of the plurality of service templates are invoked according to the associated logic; and
      when the at least one multimedia service is selected, the at least one multimedia service is invoked.

4. The non-transitory computer readable memory medium of claim 3, wherein the rules of the filtering criteria are based on external information that is not contained within the signaling message, and the filtering criteria are applied in light of the external information to select the at least one multimedia service or the one of the plurality of service templates.

5. The non-transitory computer readable memory medium of claim 4, wherein the rules of the filtering criteria are further based on internal information, which is contained in the signaling message.

6. The non-transitory computer readable memory medium of claim 3, wherein the filtering criteria is defined on a per network basis and applied to all signaling messages for a defined network.

7. The non-transitory computer readable memory medium of claim 3, wherein the filtering criteria is defined on a group basis and applied to all signaling messages for a defined group of user elements or users.

8. The non-transitory computer readable memory medium of claim 1, wherein invoking a given multimedia service comprises determining an application server to provide the multimedia service and forwarding the signaling message to the application server.

9. The non-transitory computer readable memory medium of claim 8, wherein the program instructions are further executable to implement:
   providing message and protocol adaptation to the signaling message prior to forwarding the signaling message to the application server, wherein the application server resides on a network using a different communication protocol than a network supporting the call/session control function.

10. The non-transitory computer readable memory medium of claim 8, wherein the application server will process the signaling message to provide the given multimedia service and wherein the program instructions are further executable to implement:
   receiving the signaling message from the application server; and
   forwarding the signaling message toward a destination.

* * * * *